Sept. 2, 1958 J. M. ROBINSON ET AL 2,850,583

TELEPHONE DESK SET

Filed May 16, 1955 2 Sheets-Sheet 1

Inventors:-
James M. Robinson
Leonard J. Greshel,
Donald A. Lewis,
By Brown, Jackson, Boettcher & Dienner
Attys.

Inventors:-
James M. Robinson
Leonard J. Greshel,
Donald A. Lewis,
By Brown, Jackson
Boettcher & Dienner Attys.

United States Patent Office 2,850,583

Patented Sept. 2, 1958

2,850,583

TELEPHONE DESK SET

James M. Robinson, Leonard J. Greshel, and Donald A. Lewis, Galion, Ohio, assignors to North Electric Company, a corporation of Ohio Application May 16, 1955, Serial No. 508,632

5 Claims. (Cl. 179—147)

The present invention relates to telephone desk sets and more particularly to a novel and improved telephone desk set characterized by a handle positioning feature which comprises the provision of a unique cooperation between certain contour surfaces of the handle and the cradle or handle receiving mounting of the telephone base.

Conventional telephone desk sets comprise a handle containing the transmitter and receiver elements of the telephone set and a desk stand which encloses the ringer equipment, line terminals and in certain instruments a dialing mechanism for initiating a call. In general, the desk stand has a mounting on an upper portion thereof constituting a handle receiving section or cradle designed to hold the handle in a conveniently accessible position when the telephone set is not in use. A pair of plungers are located in the cradle portion of the desk stand and are adapted to be depressed by the mass of the handle when it is in its rest position. In this condition the plungers effect closure of contacts in the telephone stand to condition the equipment therein for the reception of a telephone call in the well known and conventional manner. Upon the removal of the handle from cradle, the plungers are released and raised by a spring biased mechanism to effect closure of other contacts which condition the instrument for the initiation of a call. Such arrangement requires no elaboration as it is completely familiar to those acquainted with the telephone art.

One of the common causes of inefficient telephone usage is the careless and improper replacement of the handle in the cradle by a subscriber after the completion of a call. That is, failure by a subscriber to properly replace his handset in the cradle results in a so-called "off-hook" condition. As a result of such condition the plungers are not depressed and the telephone set is not conditioned for the reception of subsequent calls. The "off-hook" condition in a dial system results in routing incoming calls for such subscriber to a busy line and important calls may be needlessly lost as a result of such condition. In a manual system the operator is improperly signalled, and valuable time is necessarily wasted in attempting to correct the "off-hook" situation.

In addition to these circuit difficulties, if the handle is carelessly placed in the cradle, it may result in damage to the instrument or the surface of the supporting member for the instrument.

It is an object of the present invention to minimize the above difficulties by providing a new and novel telephone desk stand in which, by virtue of a unique cooperation between certain surfaces of the handle and the cradle, the correct seating of the handle is automatically assured.

In accordance with the present invention, the handle may be of conventional design comprising an elongated portion having ball-like housings at either end for enclosing the receiver and transmitter transducers respectively. The cradle of the desk stand comprises a pair of handle receiving portions disposed on either side of a central handle supporting portion and having sloping sides upon which certain points on the surfaces of the ball-like surfaces pivot and are guided so that the handle automatically falls into its normal rest position upon release by the user.

Other objects and features of the invention will become more apparent by reference to the following specification and accompanying drawings wherein a preferred embodiment of the structure is illustrated and in which like reference numerals identify like elements.

*Desk stand*

Figure 1:
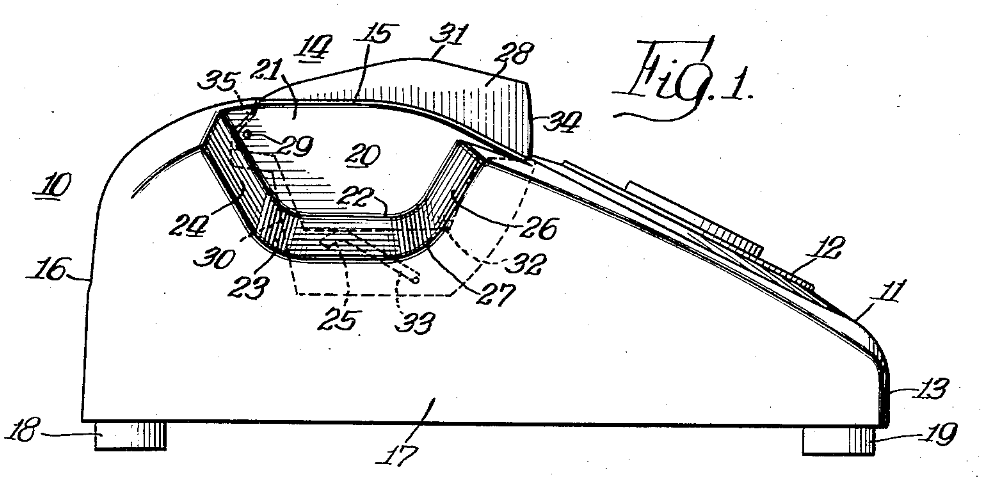
Figure 1 is a side view of a desk stand incorporating the features of the present invention.

With reference to Figure 1 which is a side view of a telephone desk stand incorporating the novel cradle or handle receiving portions of the invention, as a part thereof, there is shown thereat a telephone desk stand, indicated generally by the legend 10. For illustrative purposes, reference is made to a telephone desk stand having the general features of the desk stand of the present invention without, however, the specific, novel cradle mounting and plunger arrangement of the present invention. One such instrument has been made commercially available to the field by the North Electric Company of Galion, Ohio, as model N–541.

The commercial telephone instrument as known in the field comprises a desk stand which houses the ringer equipment, loop compensating networks, dial equipment, contacts for conditioning the equipment for initiating or receiving calls, and handle operated plungers for actuating the conditioning contacts. An upper portion thereof comprises a handle receiving mounting which provides a resting place for the handle when the telephone is not in use, and which also provides a convenient arrangement for effecting the actuation of the plungers by means of the telephone handle. The handle of telephone set may be of any known type, the dimensions and configuration of which conform to the substation contour as more fully described hereinafter. One such type is disclosed and claimed in United States Patent No. D. 174,098, issued to James M. Robinson and Donald A. Lewis on February 27, 1955, and assigned to the present assignee.

Figure 2:
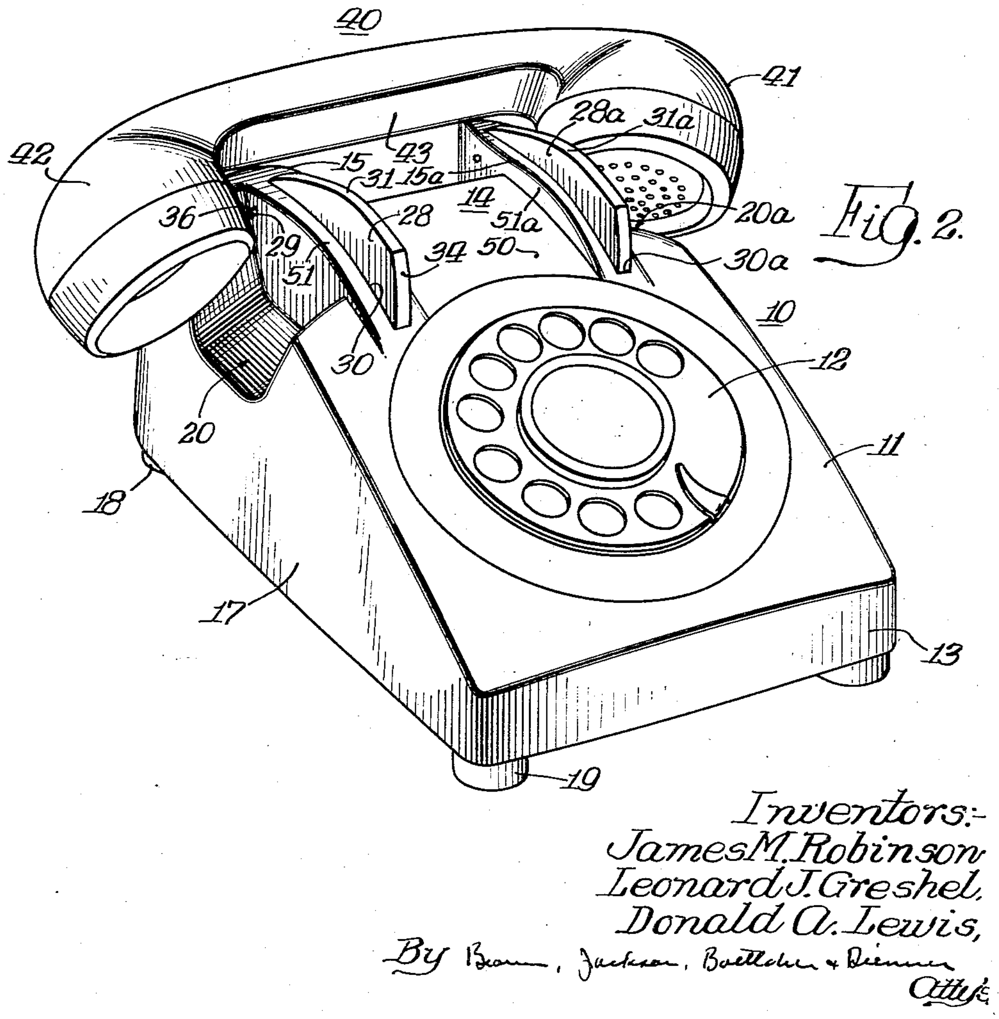
Figure 2 is a perspective view of the desk stand and its associated handle in an "off-hook" position.

For convenience, the utility and operation of the unique cradle mounting of the present invention will be shown in the environment of a desk stand now conventional in the field and exemplified by the afore-identified North set N–541. It should be noted that the invention constitutes an improvement which may be utilized with all conventional telephone desk sets, and is not to be limited to such set. Although only one side of the desk stand 10 is shown in the drawings, it will be realized that the desk stand is a solid structure, and that a second side, identical in all respects, is spaced therefrom by a distance determined by the longitudinal dimension of the handle to be positioned thereon as in the above cited model. Desk stand 10 which may be composed of any commercially available plastic, metal or other material comprises, as best shown in Figures 1 and 2, a downwardly inclined front wall section 11 which encloses a dial mechanism and housing 12 of conventional design. The inclined front wall 11 at its lowermost edge blends into a vertical wall 13. Extending rearwardly from inclined wall section 11 is a section 14 having an arcuately shaped upper surface 15 which gradually merges with a second vertical wall 16 at the rear of the desk stand. The specific nature of section 14 and surface 15 will become more apparent with reference to subsequent figures. A wall or panel 17, forming a closure for one side of the desk stand, connects inclined section 11 and the two downwardly extending walls 13 and 16. The lower edges of wall portions 13, 16 and 17 lie in a common plane and define the lower edge of the desk stand. Supporting members or feet 18 and 19 are attached to a base plate (not shown) which forms an enclosure for the bottom of the desk stand and supports the telephone mechanism (not shown) enclosed thereby.

In Figure 1 is illustrated only one of a pair of notches or handle receiving portions disposed on either side of the desk stand to receive the receiver and transmitter housings of the handle. These notches are identical in configuration and each is adapted to receive the ball-like receiver or transmitting housing of the handle. The illustrated notch or handle receiving portion 20 which constitutes a part of the present invention is formed by cutting away a portion of the central section 14, and comprises a vertical back wall portion 21 which extends downwardly a short distance from the upper surface 15 of portion 14. The surface area of back wall 21 is circumscribed at its top by arcuate surface 15 and around its other three sides by a generally U-shaped border or edge 22. Edge 22 defines the inward contour of the upper surfaces of the cut-away portions forming part of receiving notch 20.

The remaining contour defining notch 20 is formed by a flared out section 23 which has an upwardly and rearwardly extending surface 24, a bottom surface 25 and an upwardly and forwardly extending surface 26 all of which blend to form a U-shaped surface having an outer edge 27. Surfaces 24, 25 and 26 of section 23 define an oblique angle with respect to vertical wall 21 and extend outwardly therefrom a convenient distance to cooperate with the handset in the manner to be described more fully hereinafter. In the illustrated desk stand, wall 17 is designed to curve slightly inwardly at its top so that the width of the upper ends of surfaces 24 and 26 is slightly less than that of bottom surface 25 to achieve a funneling effect. Upwardly-angled surfaces 24 and 26 thereby constitute pivotal areas upon which the surfaces of the ball-like housings of the handle turn and ride in their self-adjusting movement.

A plunger 28, eccentrically pivoted is spring-biased so as to extend above arcuate section 15 in the absence of the handle. Plunger 28 may be of a number of different configurations and as shown comprises a flat plate of relatively small thickness, having a pivot receiving aperture 29 at one end, and having a longitudinal dimension greater than its transverse dimension. Plunger 28 is arranged to pivotally ride within a slot 30 (shown in dotted outline) which serves as a guide means to insure angular movement of plunger 28 in a vertical plane. The upper surface 31 of plunger 28 is shaped to conform to the contour of surface 15 so that no part of the plunger protrudes above this surface when the plunger is depressed and pivotally moves within the confines of its guiding slot 30. The lower edge 32 of plunger 28 forms a cam surface upon which a contact actuator 33 rides as the plunger moves from its extended to its enclosed positions. The leading edge 34 of plunger 28 is slightly convex to prevent its binding on the forward wall of slot 30 during its angular travel. The upper surface of the trailing edge of plunger 28 has a small notch 35 which engages an overhanging extension of the slot to limit the upward travel of the plunger 28 and prevent its escape from the confines of slot 30.

Referring now to contact actuator 33, it will be recalled that it rides upon cam surface 32 of plunger 28. When the plunger 28 is in its most extended position as shown, contact actuator 32 is arranged to operate contacts (not shown) in the manner well known in the art to condition the telephone set for the initiation of a call. When the plunger 28 is depressed by restoration of the handset to the cradle, the plunger 28 pivots about a pin 36 extending through the side walls of the slot and aperture 30 to assume a position wherein surface 32 is inclined with respect to its former position (shown more fully in Figure 3). Contact actuator 33 is moved downwardly and effects operation of certain other contacts (not shown) in the conventional manner to condition the telephone substation set for the reception of incoming calls.

For a more general view of the desk set and handset of the present invention, reference is made to Figure 2 which is a perspective view thereof, illustrating a handle 40 displaced at the rear of the cradle. The desk stand herein shown has a housing 10 for enclosing the operating mechanism of the desk stand. The outer surfaces of desk stand 10 are designated with identifying numerals idential to those of Figure 1, and will not be further described.

From this view it may be seen more clearly that a cradle mounting 20*a* complementary to cradle 20 is mounted on the opposite side of the desk stand and has associated therewith a plunger 28*a* identical in all respects with plunger 28. A slot 30*a* is provided to guide plunger 28*a* in its pivotal movement. The nature of the relationship between the plunger 28 and the cradle mounting is more readily seen in this view. Section 14 of the desk stand which blends into forward wall 11 and rear wall 16, has a centrally depressed portion 50 flanked by two raised rail portions 51 and 51*a*. The raised rail portions 51 and 51*a* have centrally located slots 30 and 30*a* in which plungers 28 and 28*a* are pivotally guided. Surfaces 15 and 15*a* define the upper contour of rails 51 and 51*a* respectively and form support areas for the underside of handle 40 in its rest position.

Handle 40 comprises a central longitudinal portion of generally rectangular cross-section which blends into a hemispherical or ball-like transmitter housing 41 at one end and into a similar receiver housing 42 at the other. The under surface 43 of handle 40 is adapted to rest upon rails 51 and 51*a* when the handle is in its normal rest position, and to ride upon surfaces 31 and 31*a* of plungers 28 and 28*a* which aid in imparting rotation to the handset as it is replaced or removed from the desk stand.

The handset 40 may be any one of a number of known designs, one of which was disclosed and claimed in the above-identified patent issued to James M. Robinson and Donald A. Lewis. It should be realized that the actual distance between notches 20 and 20*a* is not critical but is determined by the spacing between the receiver and transmitter housings of the handset. Minor variations in the dimensions of the surfaces of the notches, the distance between the notches and the angular relationship between the various contour forming surfaces may be made without substantially affecting the utility of the disclosed invention, provided that the dimensions are such as to prevent binding the handset so as to prevent its freedom to rotate and move into its rest position.

As shown in this figure, handle 40 is shown in a position in which it is improperly seated in the cradle, but is in a position in which the self-seating arrangement of the invention can operate to locate the handle in its normal rest position as will become more readily understandable from the ensuing discussion.

Figures 3, 4, 5:
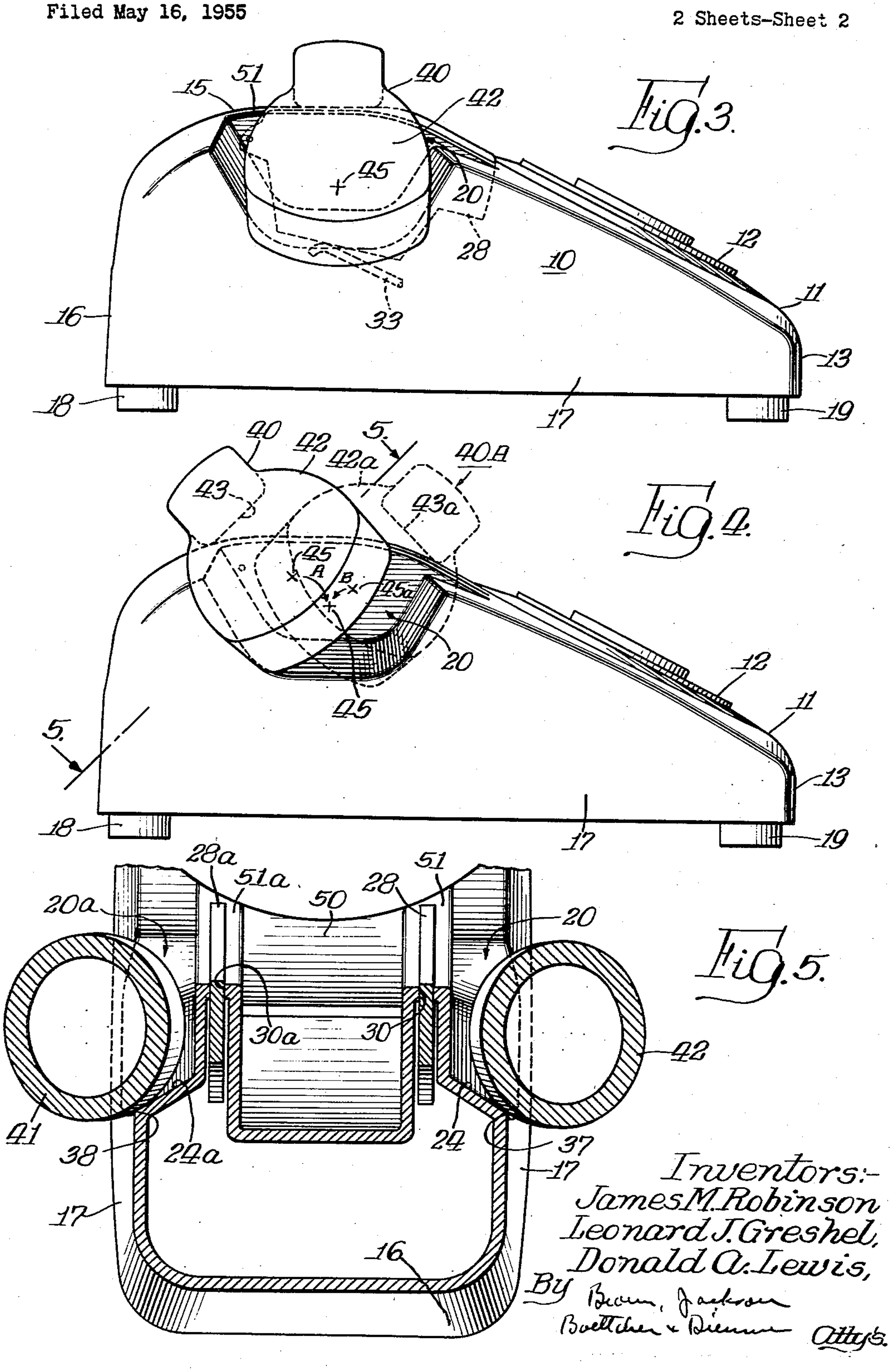
Figures 3 and 4 are side views of the handle and desk stand showing the handle in various positions with respect to the desk stand.
Figure 5 is a cross-sectional view taken along line 5—5 of Figure 4 illustrating the cooperating contours of the handle and desk stand.

As is well known, when the telephone set is not in use, the handle rests upon the cradle of the desk set and acts to depress the plungers so as to condition the set for the reception of incoming calls. Such condition is illustrated in Figure 3 in which handset 40 is in its normal rest position with respect to desk stand 10. The receiver housing 42 is partially encompassed by handle receiving portion 20, while the transmitter housing is encompassed by handle receiving portion 20a (not shown). The under surface 43 of handle 40 is supported by rails 51 and 51a and by its weight handle 40 has caused plungers 28 and 28a to be angularly displaced so as to be fully encased in their respective slots 30 and 30a. Under surfaces 31 and 31a of plungers 28 and 28a become coterminous with surfaces 15 and 15a of rails 51 and 51a. Contact actuator 33 is moved downwardly by cam surface 32 of plunger 28, and effects closure of contacts (not shown) to condition the telephone mechanism for reception of an incoming call.

It is well known to those skilled in the art that the center of gravity of the telephone handle in its rest position may be thought of as being concentrated on a line passing through the transmitter and receiver portions of the handle. For purposes of simplifying the ensuing explanation of the function of the cradle portion of the desk stand in effecting the automatic self-seating action of the handle, the center of gravity of handle 40 will be considered to be along a line passing through a point 45 near the center of volume of the receiver portion 42 thereof.

To illustrate more fully the manner in which the handle automatically seats itself in its desired rest position after it is placed in the cradle, reference may be had to Figure 4 in which the handle 40 is shown in two alternative positions. A solid line drawing of handle 40 represents the case in which the handle is carelessly placed near the rear of the desk set with a point on the under surface 43 of handle 40 resting upon arcuate surface 15, in the manner illustrated in the perspective drawing of Figure 2. The handle 40a, drawn in dotted outline represents the case wherein the handle 40 is placed in an extreme forward position. It will be understood that the following explanation of the proper seating action of the handle from either its rearward or forward position applies equally to a handle assuming any position intermediate these two extreme positions. For purposes of clarity, the plunger 28 is not shown in Figure 4 and that portion of cradle 20 which lies inwardly of receiver housing 42 is shown in dotted outline.

The automatic seating operation of the handle will be explained first with reference to handle 40 placed rearwardly of cradle portion 20. From Figure 4 it is apparent that a portion of the under surface 43 of handle 40 rests on surface 15 of portion 14 of the desk stand. A point on the ball-like surface of receiver portion 42 facing interiorly thereof rests in a pivotal position at a point on sloping side 24 of cradle portion 20. It may be readily seen that the handle in this position is in an unstable condition and the force of gravity will tend to pull the handle 40 in a clockwise direction, as shown by the directional arrow A, as a point on the under interior surface of housing 42 pivots upon the contacting point on surface 24 of cradle 20. Hence, when the subscriber releases the handle after he has placed it in the illustrated position in the cradle, the handle is free to rotate under the force of gravity and the rotational inertia imparted thereto forces it to continue moving in the direction of the arrow A. As handle 40 continues to rotate, it also slips downwardly along surface 24 until the center of gravity reaches its lowermost position. At this time handle 40 assumes its normal rest position as shown in Figure 3 and its undersurface depresses the plunger 28 in the manner above described to close the telephone contacts (not shown) to condition the equipment for the reception of additional calls. During the rotational movement of the handle, its upper surface 43 rides along surfaces 15 and 15a of rails 51 and 51a.

Similarly if the handle 40 is cursorily placed in its extreme forward position as shown in dotted outline, the handle 40a is urged toward its rest position by the pivotal movement about a point on surface 26 upon which the handle rests before its release, in a manner similar to that described with reference to handle 40. The handle rotates in a counterclockwise direction as shown by directional arrow B to achieve its final rest position.

For a more detailed view of the pivotal cooperation between the handle 40 and the cradle portions 20 and 20a of desk stand 10 reference may be had to Figure 5 which is a fractional view partly in cross-section of the handle and desk stand arrangement taken along line 5—5 of Figure 4. This view shows a cradle section 20 on one side of desk stand 10 and a corresponding cradle section 20a on its other side. A transmitter housing 41 shown in cross-section cooperates with the upwardly extending surface 24a of cradle section 20a in a manner identical to that discussed with reference to the receiver housing 42 and its cooperating sloping surface 24 in achieving the pivotal movement which results in the final seating of handle 40 in its proper position with respect to desk stand 10. In this view the nature of portion 14 is clearly shown as comprising a central depressed portion 50 and a pair of raised surfaces 51 and 51a which act as rails or tracks upon which the underside of handle 40 rides in its pivotal movement.

As illustrated in Figure 5 the receiver housing 42 and transmitter housing 41 rest upon points 37 and 38 respectively on the rearwardly sloping surfaces 24 and 24a of cradle portions 20 and 20a. The pivotal movement previously discussed tends to rotate the handle about these points to initiate the automatic seating movement of the handle in its cradle.

What has been set forth hereat is a novel telephone desk stand having a unique handset positioning cradle mounting which prevents "off-hook" troubles caused by the improper or careless placing of the handle on the desk stand. Upwardly extending surfaces of the cradle mounting provide pivotal areas for automatically guiding the surfaces of the ball-like receiver and transmitter housings of the handset along a course and in a direction to position the handset properly in its normal rest position independently of the manner in which it is replaced on the desk stand following its use.

While a particular type of substation arrangement has been herein shown and described, it is apparent that the novel features of the invention are independent thereof and any conventional type of plunger arrangement is suitable for use therewith. More conventional types of plungers which may be fully substituted for that illustrated may be cylindrical in form and adapted to move vertically in a bushing of circular cross-section or may be of the plate type, in the form of a quasi-rectangular solid having an arcuate upper surface as illustrated in the above-identified patent to Robinson and Lewis.

While what has been described is regarded to be a preferred embodiment of the invention, it will be apparent that variations, rearrangements, modifications and changes may be made therein without departing from the scope of the present invention as defined by the appendent claims.

We claim:

1. A mounting on a substation desk stand for a telephone handset member which comprises an elongated handle section extending between two ball-like terminating portions, said mounting comprising a pair of complimentary cup-like receiving portions respectively disposed at either side of the substation desk stand for receiving said ball-like terminating portions of the handset, each of said cup-like receiving portions comprising at least two downwardly converging sloping guide surfaces separated by a distance which is a maximum at the top of said receiving portions, said guide surfaces being adapted to engage a surface of each of said ball-like terminating portions as placed on the desk stand to thereby pivotally guide said member into a given rest position on the substation set.

2. A mounting on a substation desk stand for a telephone handset member which comprises an elongated handle section extending between two ball-like terminating portions, said mounting comprising a pair of complimentary cup-like receiving portions respectively disposed at either side of the substation desk stand for receiving said ball-like terminating portions of the handset, each of said receiving portions comprising a side wall whose upper surface constitutes a track, and at least two downwardly converging sloping guide surfaces separted by a distance which is a maximum at the top of said receiving portions, said giude surfaces being adapted to engage a surface of each of said ball-like terminating portions as placed on the desk stand to thereby pivotally guide said member along said track into a given rest position on the desk stand.

3. A mounting on a substation desk stand for a telephone handset member which comprises an elongated handle section extending between two ball-like terminating portions, said mounting comprising a pair of complimentary cup-like receiving portions respectively disposed at either side of the substation desk stand for receiving said ball-like terminating portions of the handset, each of said receiving portions comprising a side wall, a pair of downwardly converging guide surfaces of given width outwardly extending at an obtuse angle with respect to said wall, said guide surfaces being separated by a distance which is a maximum at the top of said receiving portions, and a connecting surface spanning the lower edges of said pair of guide surfaces to complete said receiving portion, said sloping guide surfaces being adapted to engage a surface of each of said ball-like terminating portions as placed on the desk stand to thereby pivotally guide said member into a given rest position on the desk stand.

4. A mounting on a substation desk stand for a telephone handset member which comprises as elongated handle section extending between two ball-like terminating portions, said mounting comprising a pair of complimentary cup-like receiving portions respectively disposed at either side of the substation desk stand for receiving said ball-like terminating portions of the handset, each of said receiving portions comprising at least two downwardly converging sloping guide surfaces separated by a distance which is a maximum at the top of said receiving portions, said guide surfaces being adapted to engage a surface of the ball-like terminating portions as placed on the desk stand to thereby pivotally guide said member into a given rest position on the substation set, and a pair of plungers each of which is disposed in one of said upper surfaces of said rear walls and protrudes upwardly therefrom, for actuation by said handset in movement to its rest position.

5. A positioning device for sustaining a member in a predetermined fixed rest position, said member having an elongated portion of substantially constant width and a substantially flat undersurface intermediate two terminating portions, each of which depends from said elongated portion below said flat undersurface, each of said terminating portions comprising a ball-like member having a continuously curved surface extending transversely beyond said elongated portion; said positioning device having two cup-like receiving depressions individually disposed on either side of said device and spaced apart by a predetermined distance to receive respectively said terminating portions of said member; each of said depressions having at least two downwardly converging sloping guide means separated by a distance which is a maximum at the top of said receiving depressions, said guide means being adapted to be cooperatively associated with one of said continuously curved surfaces of said terminating portions and providing a pivotal surface for guiding said member to a predetermined fixed position, said positioning device further including a second guide means disposed between said receiving depressions and forming upwardly extending interior terminating walls for said depressions for establishing said predetermined distance between said receiving depressions and adapted to be cooperatively associated with said flat underside of said member for supporting said member in its final rest position.

References Cited in the file of this patent

UNITED STATES PATENTS

| | | |
|---|---|---|
| 153,927 | Dreyfuss et al. | May 31, 1949 |
| 157,849 | Dreyfuss | Mar. 28, 1950 |

FOREIGN PATENTS

| | | |
|---|---|---|
| 138,008 | Australia | July 18, 1950 |
| 674,587 | Great Britain | Aug. 10, 1950 |